(12) United States Patent
Halstead et al.

(10) Patent No.: US 11,603,948 B2
(45) Date of Patent: Mar. 14, 2023

(54) ANIMAL WATERING VALVE

(71) Applicant: Avidity Science, LLC, Waterford, WI (US)

(72) Inventors: Michael P. Halstead, Greenfield, WI (US); Matthew C. Grulich, Salem Lakes, WI (US); Rebecca M. Fowler, Waterford, WI (US); Thomas Clark, Oak Creek, WI (US); Peter S. Planton, Muskego, WI (US)

(73) Assignee: Avidity Science, LLC, Waterford, WI (US)

( * ) Notice: Subject to any disclaimer, the term of this patent is extended or adjusted under 35 U.S.C. 154(b) by 945 days.

(21) Appl. No.: 16/352,212

(22) Filed: Mar. 13, 2019

(65) Prior Publication Data

US 2019/0383423 A1   Dec. 19, 2019

Related U.S. Application Data (60) Provisional application No. 62/686,338, filed on Jun. 18, 2018.

(51) Int. Cl.

| | |
|---|---|
| *F16K 41/10* | (2006.01) |
| *A01K 7/00* | (2006.01) |
| *F16K 51/00* | (2006.01) |
| *F16K 41/16* | (2006.01) |
| *F16K 7/16* | (2006.01) |
| *F16K 31/60* | (2006.01) |

(52) U.S. Cl.
CPC ............. *F16K 41/103* (2013.01); *A01K 7/00* (2013.01); *F16K 7/16* (2013.01); *F16K 31/602* (2013.01); *F16K 41/16* (2013.01); *F16K 51/00* (2013.01)

(58) Field of Classification Search
CPC ........ F16K 41/103; F16K 7/16; F16K 31/602; F16K 41/16; F16K 51/00; A01K 7/00
See application file for complete search history.

(56) References Cited

U.S. PATENT DOCUMENTS

| | | |
|---|---|---|
| 4,006,716 A | 2/1977 | Cross |
| 5,065,700 A | 11/1991 | Cross |
| 5,253,842 A | 10/1993 | Huebscher et al. |
| 6,058,881 A | 5/2000 | Thompson |
| 6,941,893 B2 | 9/2005 | Gabriel et al. |
| 6,981,469 B1 | 1/2006 | Welbourne |
| 6,986,324 B2 | 1/2006 | Gabriel et al. |
| 7,303,713 B2 | 12/2007 | Gabriel et al. |

(Continued)

*Primary Examiner* — Kevin R Barss
(74) *Attorney, Agent, or Firm* — Boyle Fredrickson S.C.

(57) ABSTRACT

An animal watering valve includes a housing having an upstream end, a downstream end, a bore extending therebetween, a valve element and a valve actuator located at least in part in the bore, and a plug disposed within the bore upstream of the valve element. The plug includes a lattice structure extending along a length of the plug. The valve element may be a diaphragm disposed within the bore to separate the bore into upstream and downstream portions. The valve actuator has a stem with a stem body extending downstream from a stem head and through an outlet of the housing. The diaphragm includes a sealing surface with first and second annular ridges and a groove disposed therebetween. A stem hat having a cap and disk is coupled to a downstream end of the stem. The disk extends radially from the stem at a location upstream of the outlet.

19 Claims, 10 Drawing Sheets

(56) References Cited

U.S. PATENT DOCUMENTS

| | | |
|---|---|---|
| 7,546,816 B2 | 6/2009 | Gabriel et al. |
| 7,798,171 B2 | 9/2010 | Gabriel et al. |
| 7,937,836 B2 | 5/2011 | Gabriel et al. |
| 8,166,917 B2 | 5/2012 | Welbourne |
| 8,844,467 B1 | 9/2014 | Folkerts et al. |
| 9,433,190 B2 * | 9/2016 | Johnson .................. A01K 7/06 |
| 9,732,882 B2 | 8/2017 | Gabriel et al. |
| 9,814,213 B1 | 11/2017 | Lane et al. |
| 10,104,867 B2 | 10/2018 | Gabriel et al. |
| 2007/0245969 A1 | 10/2007 | Johnson |
| 2014/0261218 A1 | 9/2014 | Johnson et al. |

\* cited by examiner

ANIMAL WATERING VALVE

CROSS-REFERENCE TO RELATED APPLICATION

This application claims priority to U.S. Provisional Application No. 62/686,338, filed on Jun. 18, 2018, the entire contents of which are hereby expressly incorporated by reference into this application.

BACKGROUND OF THE INVENTION

1. Field of the Invention

The present invention relates generally to an animal watering valve, and more particularly, to an animal watering valve having improved flow characteristics and filtering capabilities for preventing upstream and downstream contamination issues within the valve.

2. Discussion of the Related Art

Animal actuated watering valves are well known. One such valve is disclosed in U.S. Pat. No. 9,433,190, issued to Edstrom Industries, Inc. (now Avidity Science, LLC) et al on Sep. 6, 2016 ("the Avidity Science patent"). The valve disclosed in the Avidity Science patent includes a housing having an inlet and an outlet connected by an elongated longitudinal bore, a diaphragm located within the bore, a valve seat positioned within the bore and between the diaphragm and the outlet, and a valve stem having a relatively wide valve stem head and a relatively narrow elongated lever extending downstream from the valve head into the bore. The valve head is held in position by the valve seat in the form of an elastomeric O-ring acting on its downstream surface and the diaphragm on its upstream surface. The lever is selectively deflectable by an animal to pivot the valve head relative to the valve seat from a seated position to an unseated position to permit water flow through the diaphragm, through the longitudinal bore, and out the outlet.

The valve disclosed in the Avidity Science patent works very well but exhibits some disadvantages.

For example, the valve seat of the Avidity Science patent limits the deflection of the lever. In addition, the diaphragm, valve seat, and valve stem head are susceptible to debris becoming lodged there between, which would result in the valve stem head not fully seating with the valve seat. That is, a piece of debris may deposit itself between the valve seat and the valve stem head, which would maintain an opening between the valve stem head and the valve seat and, therefore, allow water to flow through the diaphragm and valve seat.

The valve disclosed in the Avidity Science patent includes an inline filter disposed at an upstream end of the housing. The inline filter is described as possibly being a screen mesh, fiber, or sintered metal. Such filters are usually 0.1 mm thick with a single layer of openings for the water to flow through. As such, the lodging of a few pieces or even one piece of debris within the openings can noticeably restrict the flow of water through the filter and, hence, through the valve.

In addition, while the Avidity Science patent recognizes the desirability of providing a shield to prevent the animal from stuffing bedding material into the valve while also being resistant to tearing by the animal, the disclosed shield is still susceptible to having bedding cling to the shield and inhibit water flow.

The need therefore exists for an animal watering valve with improved filtration that is effective yet that is less prone to restriction that could restrict water flow through the valve.

Further, the need has arisen for an animal watering valve having a diaphragm and stem design that is resistant to debris build up so as to ensure that the stem head does not remain in an unseated position. That is, there is a need for a diaphragm having two or more sealing surfaces to provide sealing redundancy to ensure that debris build up between the diaphragm and the stem head does not prevent the sealing surface from properly seating and fully shutting off water flow.

Additionally, the need has arisen for an animal watering valve that more assuredly prevents debris from entering the downstream end of the valve and keeping the valve in the actuated position.

SUMMARY OF THE INVENTION

In accordance with an aspect of the invention, an animal watering valve includes a housing having an upstream end, a downstream end, and a bore formed therein and extending from the upstream end to the downstream end. A valve element and a valve actuator are located in the bore. The watering valve also includes a plug disposed within the bore between the upstream end of the housing and the valve element. The plug includes a lattice structure extending lengthwise of the plug. An upstream end of the plug may be flush with the upstream end of the housing.

The lattice structure may include pores sized between 20 and 100 microns. More typically, the lattice structure may include pores sized to 50 microns.

The length of the plug may be 2-8 mm. More typically, the length of the plug may be 4 mm.

In accordance with another aspect of the invention, an animal watering valve includes a housing having an upstream end, a downstream end, and a bore formed therein and extending from the upstream end to the downstream end. A valve element and a valve actuator are located in the bore. The valve element includes an elastomeric diaphragm configured to separate the bore into an upstream portion and a downstream portion, and the valve actuator comprises a relatively rigid stem having a stem head and a stem body extending downstream from the stein head. The stem head is disposed within a stem seat of the diaphragm and is surrounded by the diaphragm.

The diaphragm may include an outer collar and an inner collar. The inner collar has a sealing surface configured to seal off the upstream portion of the bore from the downstream portion of the bore so that actuation of the stem opens the seal and allows a liquid to flow from the upstream portion of the bore to the downstream portion of the bore.

The sealing surface may have two or more ridges and at least one groove formed between the ridges. Each ridge is able to individually seal off the upstream portion of the bore from the downstream portion of the bore.

The diaphragm may include a plurality of apertures circumferentially spaced around the diaphragm and extending therethrough. Each of the plurality of apertures are located between the outer collar and the inner collar.

In accordance with yet another aspect of the invention, a method of forming an animal watering valve includes 1) molding a stem to include a stem head and a stem body extending from the stem head and 2) molding an elastomeric diaphragm to include an outer collar, an inner collar, and a stem seat to surround the stem head.

In accordance with another aspect of the invention, an animal watering valve includes a housing having an outlet, an inlet, and a bore formed therein and extending from the outlet to the inlet. A valve element and a valve actuator are located in the bore. The valve actuator includes a stem disposed within the housing and extending through the outlet of the housing and a shield coupled to a downstream end of the stem. The shield hat has an outer cap of reduced diameter and an inner disk of increased diameter. The disk extends radially from the stem at a location adjacent an upstream side of the outlet.

A diameter of the disk is greater than a diameter of the outlet. Further, the diameter of the disk is sized so that an outer edge of the shield remains transversely outside the outlet during deflection of the stem. The stem may be deflected on the order of more than 2° and up to 2.7° or more.

Other objects, features and advantages of the present invention will become apparent after review of the specification, claims and drawings. The detailed description and examples enhance the understanding of the invention but are not intended to limit the scope of the appended claims.

BRIEF DESCRIPTION OF THE DRAWINGS

Preferred exemplary embodiments of the invention is illustrated in the accompanying drawings in which like reference numerals represent like parts throughout, and in which.

DETAILED DESCRIPTION

A wide variety of animal watering valves could be constructed in accordance with the invention as defined by the claims. The valve could be relatively small and designed for watering mice, or could be larger and designed for watering rats, guinea pigs, etc. They could be still larger and designed to water farm animals such as hogs. Hence, while exemplary embodiments of the invention will now be described that are relatively small and ideally suited for watering small animals such as lab mice, it should be understood that the invention is in no way limited to any of the described embodiments. In particular, any dimensions discussed in this application are exemplary and not necessarily critical.

Figure 1:
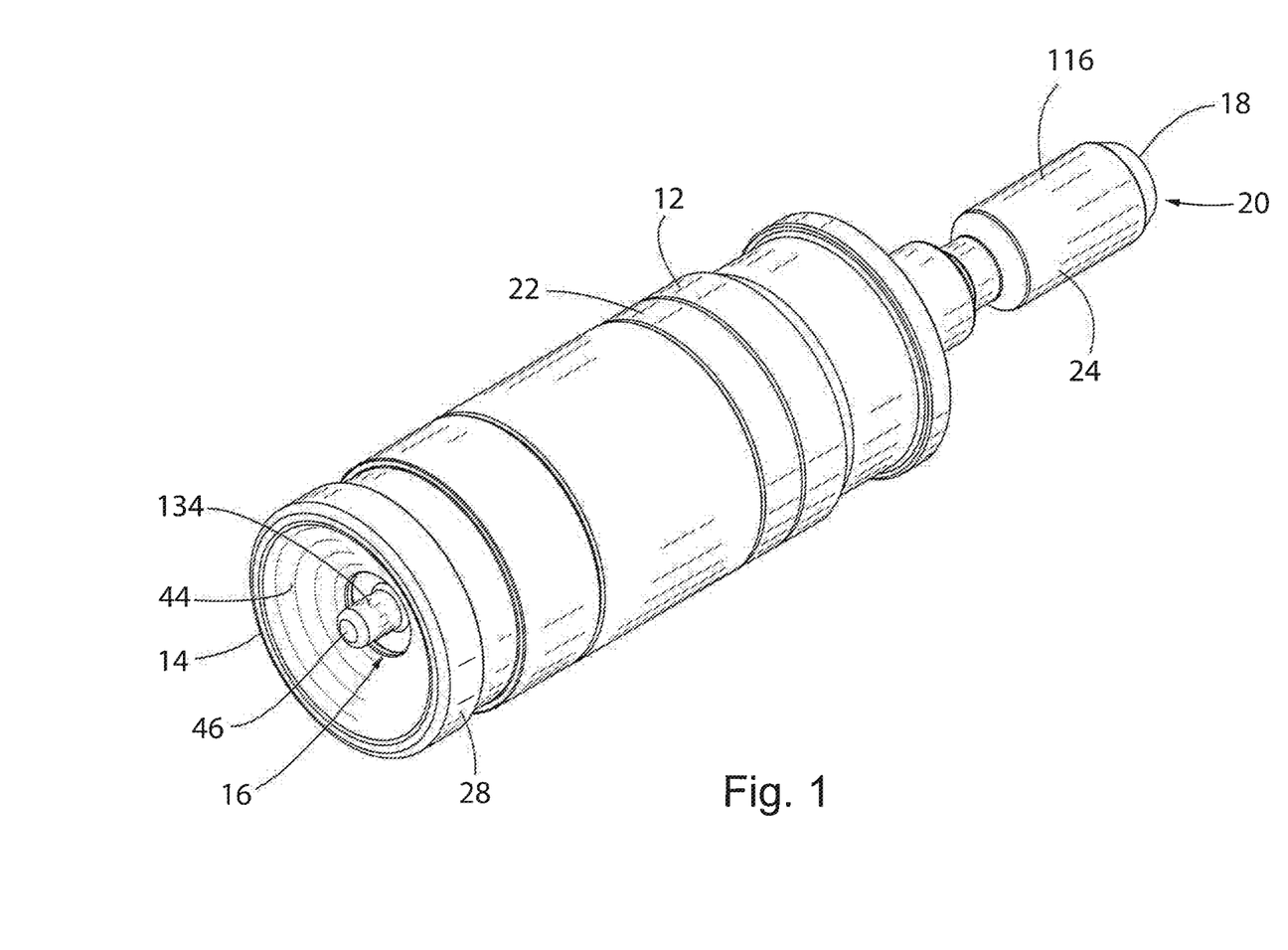
FIG. 1 is a perspective view of an animal watering valve, according to an embodiment of the invention.
Figure 2:
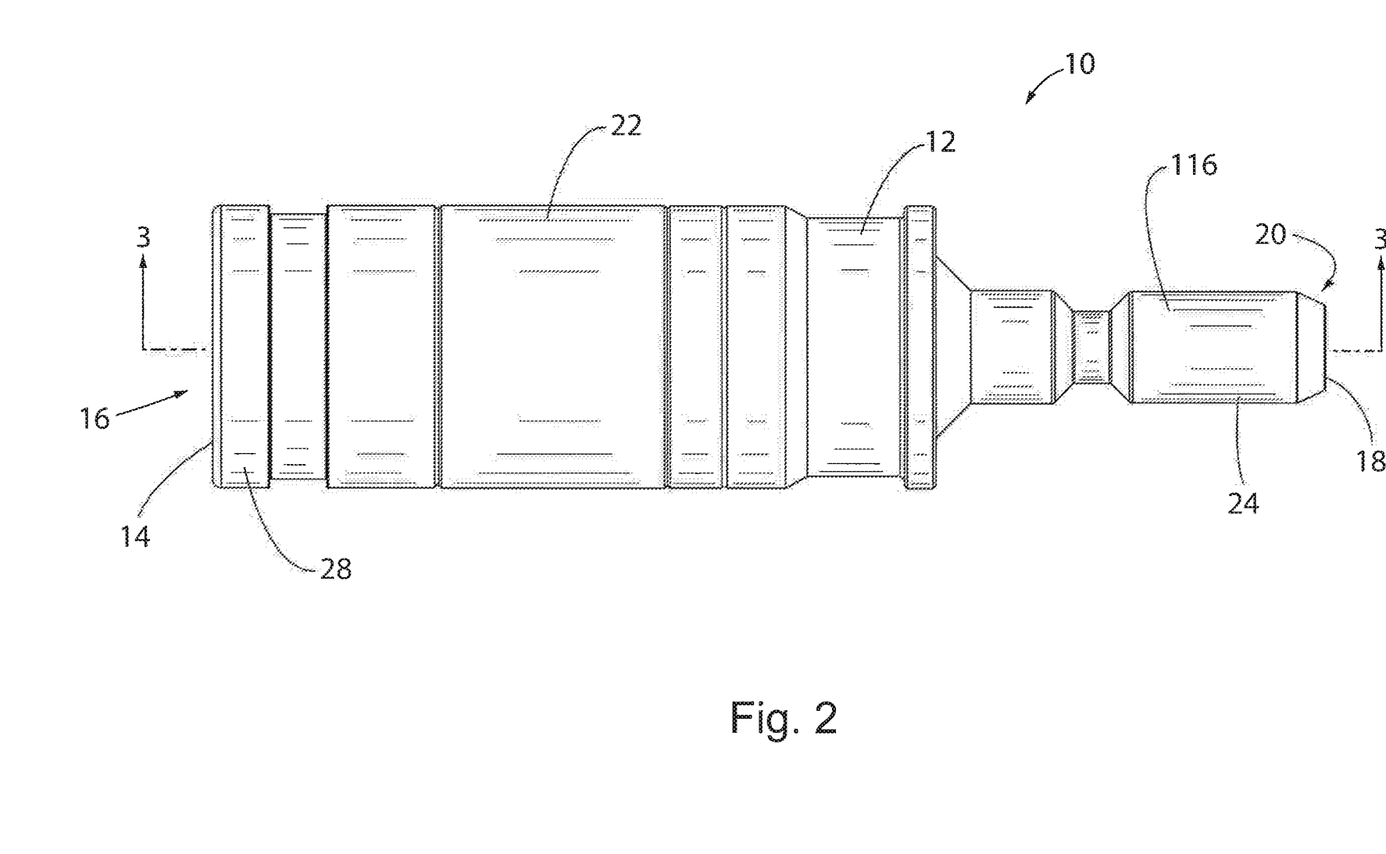
FIG. 2 is a side view of the animal watering valve of FIG. 1.
Figure 3:
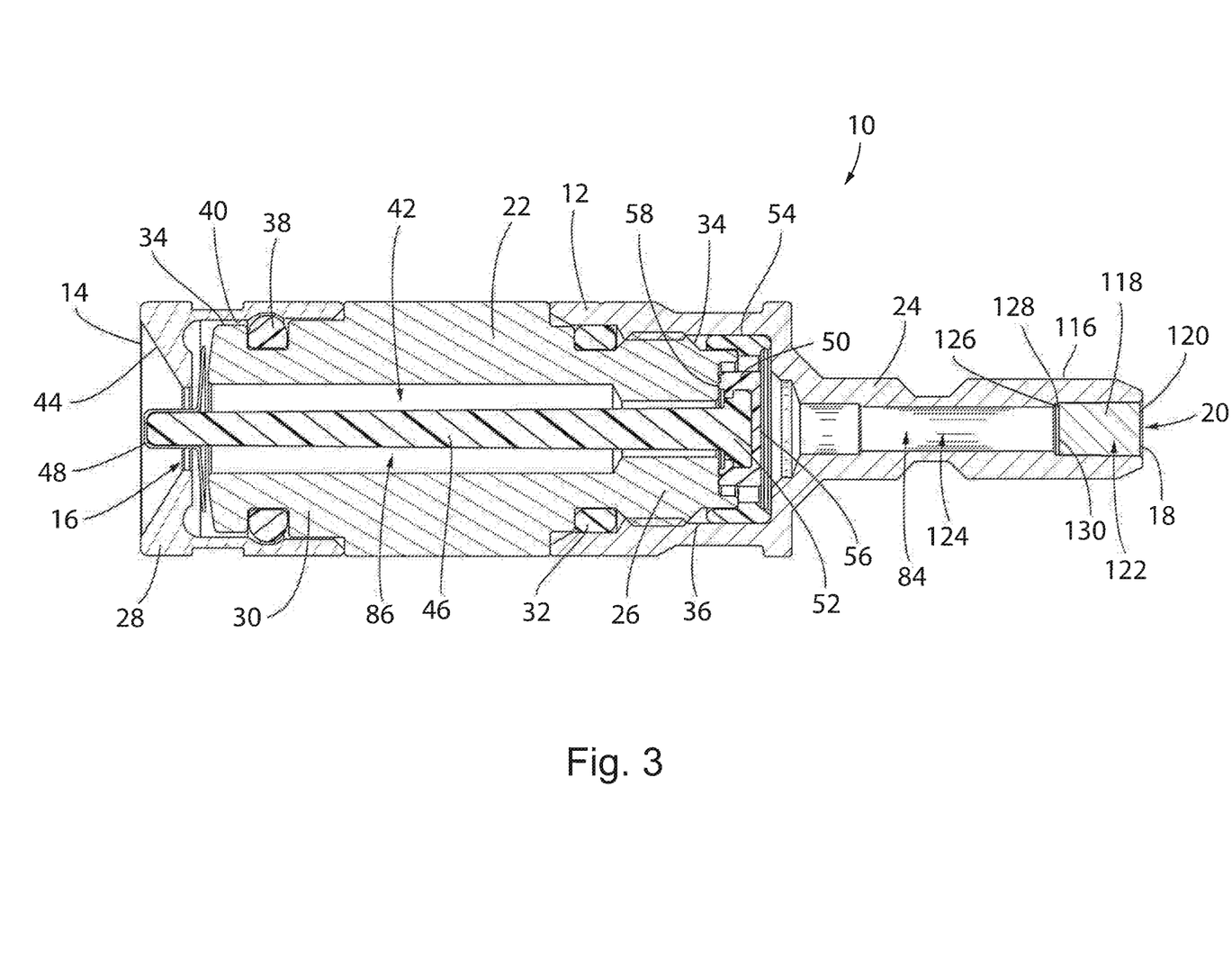
FIG. 3 is a cross-sectional side elevation view of the animal watering valve of FIG. 2, taken along line 3-3 in FIG. 2.

Referring first to FIGS. 1-3, perspective, side, and cross-sectional views of an animal watering valve 10 are shown. The animal watering valve 10 includes a housing 12 having a downstream end 14 associated with an outlet 16 and an upstream end 18 associated with an inlet 20. A bore 42 extends longitudinally through the valve ends 14 and 18 of the valve 10. A valve element 50 and an actuator 46 are provided in the bore 42 between the upstream and downstream ends 18 and 14. A plug 118 is provided in the bore 42 upstream of the valve element 50. A shield 134 is provided near the downstream end 14 of the housing 12.

As shown in the cross-sectional side elevation view of the watering valve 10 of FIG. 3, the housing 12 may be include a valve body 22, a valve cap 24 coupled to an upstream end 26 of the valve body 22, and a valve guard 28 coupled to a downstream end 30 of the valve body 22. In varying embodiments of the invention, the valve body 22, valve cap 24, and valve guard 28 may be coupled together by way of a threaded-fit manner, a snap-fit manner, etc. The valve body 22 and the valve cap 24 may be sealed by way of an O-ring 32 disposed between an outer surface 34 of the valve body 22 and an inner surface 36 of the valve cap 24. Similarly, the valve body 22 and the valve guard 28 may be sealed by way of an O-ring 38 disposed between the outer surface 34 of the valve body 22 and an inner surface 40 of the valve guard 28.

FIG. 3 further illustrates that the downstream end 30 of the valve body 22 extends into and is overlapped and surrounded by the valve guard 28. It is within this overlap, that the O-ring 38 may be disposed between the outer surface 34 of the valve body 22 and the inner surface 40 of the valve guard 28, as described above. Similarly, the upstream end 26 of the valve body 22 is shown to extend into and be overlapped and surrounded by the valve cap 24. It is within this overlap that the O-ring 32 may be disposed between the outer surface 24 of the valve body 22 and the inner surface 26 of the valve cap 24, as described above. Additionally, FIG. 3 illustrates that the outer surface 24 of the valve body 20, the inner surface 40 of the valve guard 28, and the inner surface 26 of the valve cap 24 may be individually contoured to receive their respective O-rings 38, 32 and ensure an effective seal.

The bore 42 extends longitudinally of the housing 12 and extends from the inlet 20 to the outlet 16 of the housing 12. As shown in FIG. 3, the bore 42 may vary in diameter along the length of the bore 42. While the representative embodiment of the invention illustrates the diameter of the bore 42 changing due to step changes along the length of the bore 42, it is also contemplated that the bore 42 may be tapered along all or a portion of the length of the bore 42. In yet other embodiments of the invention, it is contemplated that the bore 42 may maintain a consistent diameter throughout the length of the valve body 22.

In other embodiments of the invention, the housing 12 may include a valve guard 28 directly coupled to the valve cap 24 with the valve body 22 disposed within. In yet other embodiments of the invention, the housing 12 may include any number of separate sections coupled together.

As shown in FIGS. 1 and 3, the outlet 16 of the housing 12 may be recessed into the downstream end 14 of the housing 12. The valve guard 28 may include a flared wiping surface 44 extending from the outlet 16 to the downstream end 14 of the housing 12. A valve actuator 46 in the form of a valve stem 46, which will be described in further detail below, is disposed within the bore 42 of the housing 12 and extends in a downstream direction and through the outlet 16.

In the representative embodiment of the invention, a downstream end 48 of the stem 46 ends prior to the downstream end 14 of the housing 12. In other words, the downstream end 48 of the stem 46 is spaced inward from the downstream end 14 of the housing 12. In other embodiments of the invention, the downstream end 48 of the stem 46 may extend beyond the downstream end 14 of the housing 12 or be flush with the downstream end 14 of the housing 12.

In this embodiment, the valve element 50 includes a diaphragm 50 disposed between the inner surface 36 of the valve cap 24 and the upstream end 26 of the valve body 22. Still referring to FIGS. 1 and 3, the stem 46 extends through the bore 42 from an upstream end 52 disposed within the diaphragm 50 to the previously discussed downstream end 48. In some embodiments of the invention, the size of the stem 46 may taper from larger at the upstream end 52 to smaller at the downstream end 48. The stem 46 may taper at a 10 angle. It is contemplated that the diameter of the downstream end 48 of the stem 46 may have a diameter ranging from 0.040 to 0.080 inches and more typically of about 0.6 inches.

Referring next to FIGS. 4-8, the stem 46 and diaphragm 50 are shown in greater detail. The stem 46 is relatively rigid. It could be formed from a metal such as stainless steel. In the present embodiment of the invention, it is formed from a polymer material that is resistant to temperature changes and chemical reactions associated with chlorine, acid, autoclaving, and the like. Examples of suitable polymers include R-5100 RADEL® Polyphenylsulfone, R-5800 RADEL® Polyphenylsulfone, and HU1004 ULTEM™ Polyetherimide.

The diaphragm 50 may be comprised of an elastomeric material such as a medical-grade silicone or any other suitable material for withstanding chemical reactions associated with purified water, chlorine, acid, and autoclaving. The outer surface 54 of the diaphragm 50 extends from an upstream end 56 of the diaphragm 50, which, as shown in FIG. 3, is in contact with the inner surface 36 of the valve cap 24, to a downstream end 58 of the diaphragm 50, which is in contact with the upstream end 26 of the valve body 22. A central portion 60 of the diaphragm 50 includes an upstream face 62 spaced inward and recessed from the upstream end 56 of the diaphragm 50 and a downstream face 64 spaced inward and recessed from the downstream end 58 of the diaphragm 50. That is a thickness of the central portion 60 of the diaphragm 50 is less than a thickness of the outer surface 54 of the diaphragm 50. For example, the outer surface 54 of the diaphragm 50 may be 0.119 to 0.131 inches thick, while the central portion 60 of the diaphragm 50 may be 0.102 to 0.106 inches thick.

The central portion 60 further includes a plurality of apertures 66 extending therethrough and circumferentially spaced around the central portion 60. While the representative embodiment of the invention illustrates eight (8) apertures formed through the central portion 60 of the diaphragm 50 and spaced apart at 45° intervals, other embodiments of the invention may include more or less than eight (8) apertures spaced at other than 45° intervals. In yet other embodiments of the invention, the apertures 66 may be spaced at varying intervals. In one embodiment of the invention, the apertures 66 may be tapered from upstream to downstream at an angle of 1°. In other words, each aperture 66 may have a larger diameter at the upstream face 62 of the central portion 60 and a smaller diameter at the downstream face 64 of the central portion 60.

Figure 5:
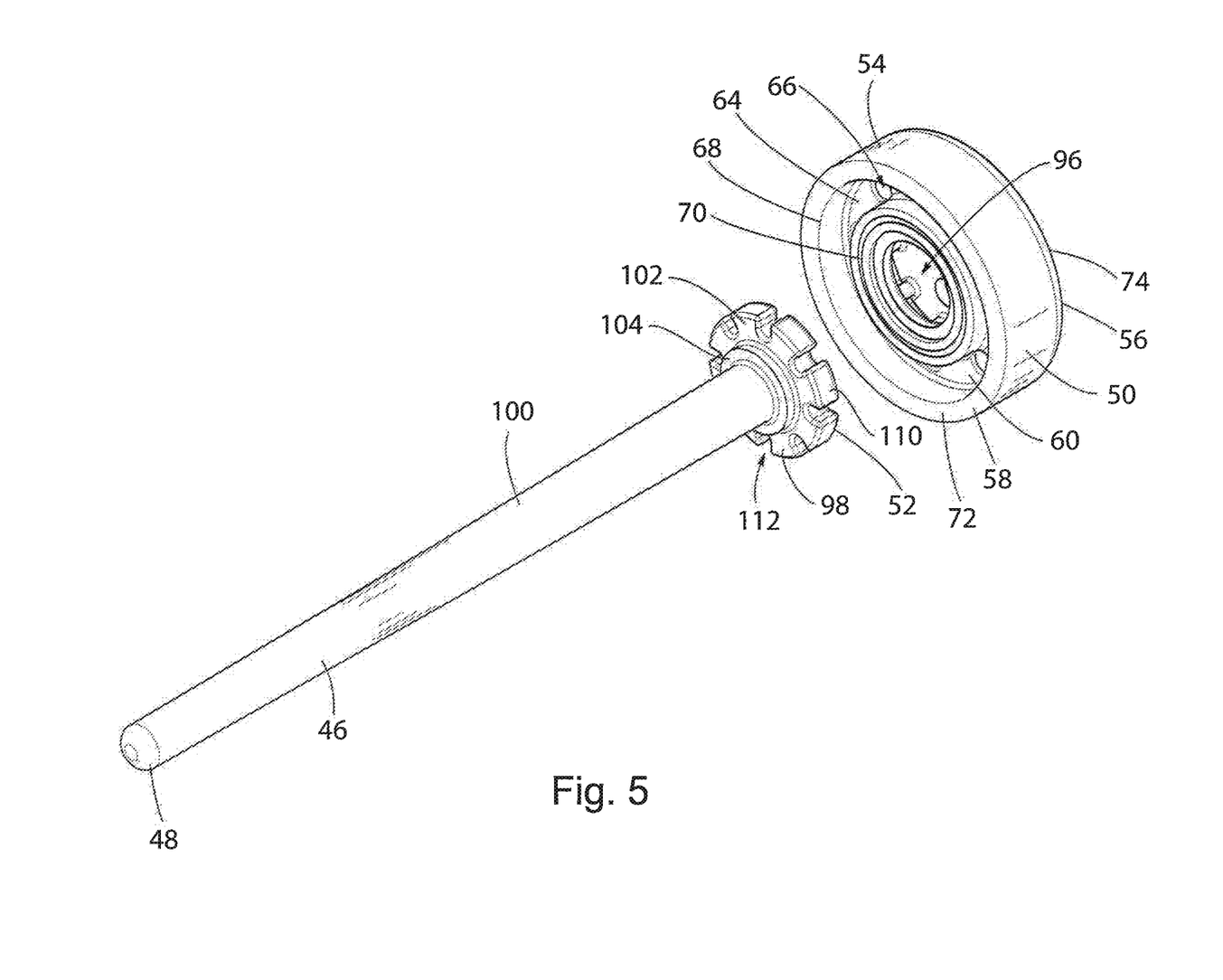
FIG. 5 is an exploded perspective view of the combined stem and diaphragm of FIG. 4.
Figure 6:
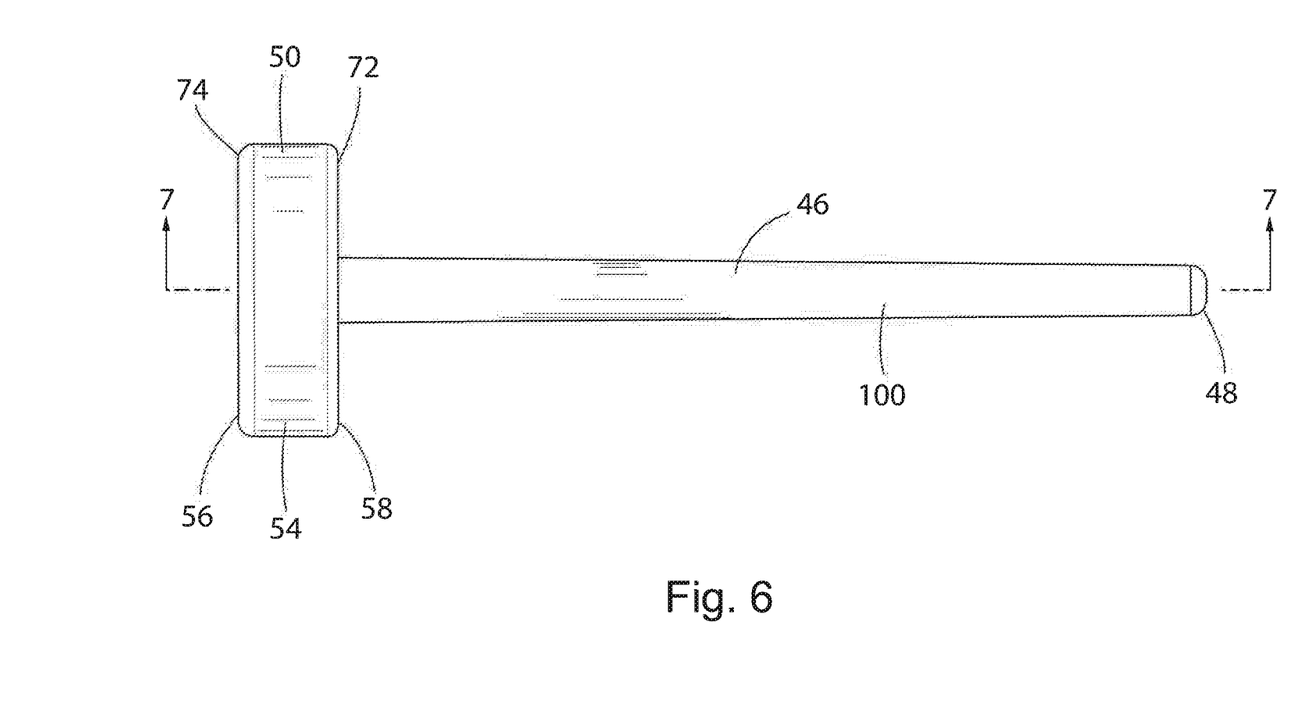
FIG. 6 is a side view of the combined stem and diaphragm of FIG. 4.
Figure 7:
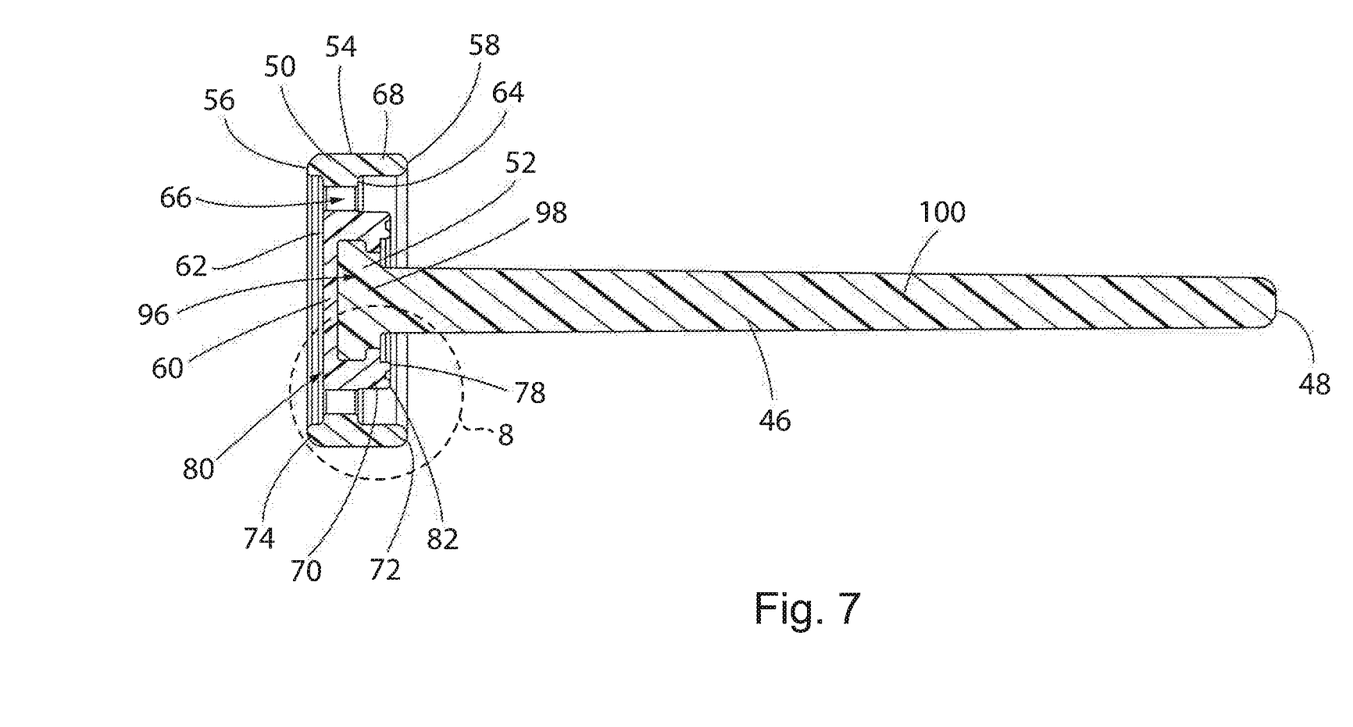
FIG. 7 is a cross-sectional view of the combined stem and diaphragm taken along line 7-7 in FIG. 6.

The diaphragm 50 additionally includes an outer collar 68 and an inner collar 70, shown in FIGS. 5 and 7. The outer collar 68 is aligned with the outer surface 54 of the diaphragm 50 and extends from a downstream end 72 aligned with the downstream end 58 of the diaphragm 50 to an upstream end 74 aligned with the upstream end 56 of the diaphragm 50. As further shown in FIG. 3, the outer collar 68 extends from its upstream end 74 in contact with the inner surface 36 of the valve cap 24, to its downstream end 72 disposed at a location beyond the upstream end 26 of the valve body 22. In turn, the downstream end 72 of the outer collar 68 of the diaphragm 50 is disposed between the inner surface 36 of the valve cap 24 and the outer surface 34 of the valve body 22 along an overlap 76 with the upstream end 26 of the valve body 22.

The inner collar 70 is inwardly spaced from and is concentrically aligned with the outer collar 68. For example, the outer collar 68 may have an outer diameter of 0.360 to 0.368 inches and an inner diameter of 0.307 to 0.313 inches, while the inner collar 70 may have an outer diameter of 0.218 to 0.222 inches and an inner diameter of 0.154 inches. The inner collar 70 includes a downstream end 78 that is axially spaced apart from the downstream face 64 of the central portion 60 of the diaphragm 50. As shown in FIGS. 3 and 7, the downstream end 78 of the inner collar 70 is located further upstream than the downstream end 72 of the outer collar 68.

In other embodiments of the invention, the downstream end 78 of the inner collar 70 may be axially aligned with the downstream end 72 of the outer collar 68. In yet other embodiments of the invention, the downstream end 78 of the inner collar 70 may be located further downstream than the downstream end 72 of the outer collar 68.

Figure 8:
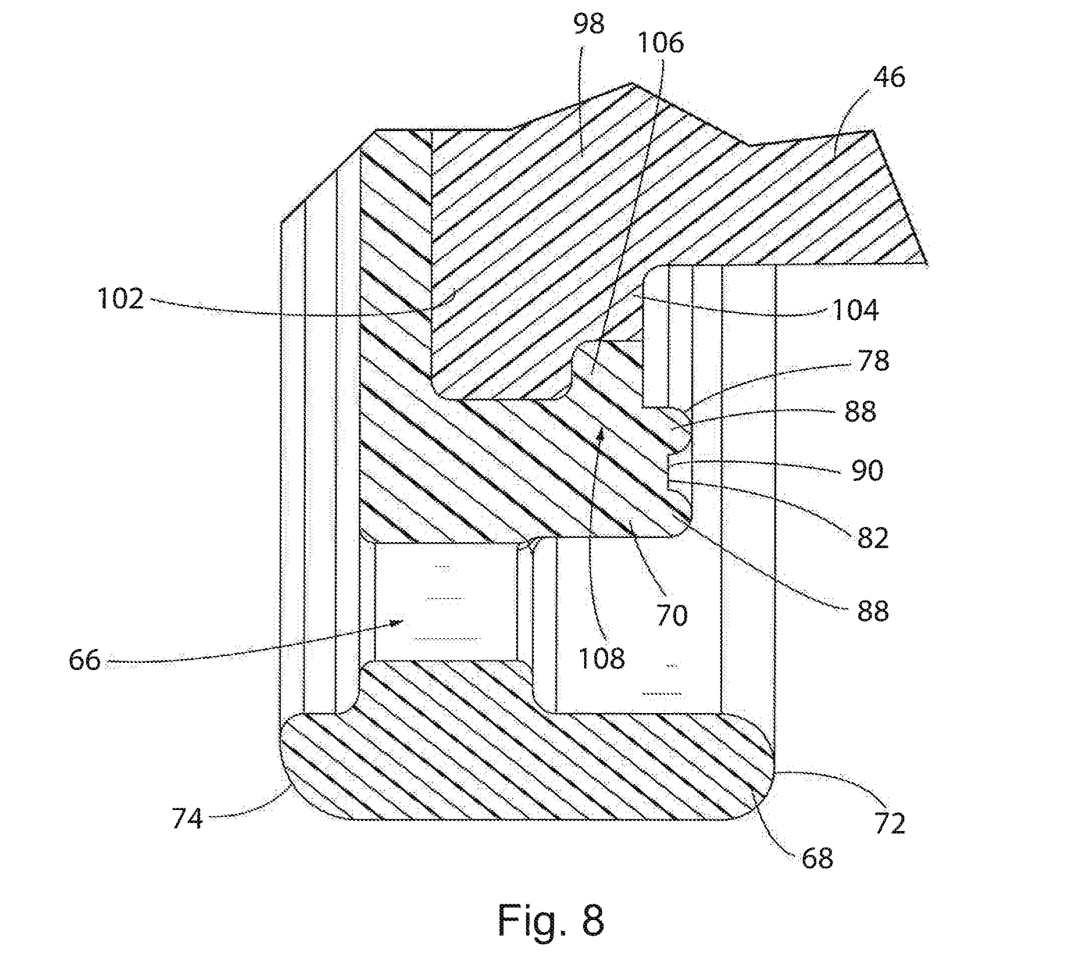
FIG. 8 is an enlarged fragmentary cross-sectional view a portion of the combined stem and diaphragm designated "8" in FIG. 7.

FIG. 3 depicts the downstream end 78 of the inner collar 70 being in contact with a surface formed from a step on the upstream end 26 of the valve body 22. The downstream end 78 of the inner collar 70 includes a sealing surface 82 in order to seal off an upstream portion 84 of the bore 42 from a downstream portion 86 of the bore 42. FIG. 8 shows an enlarged view of the sealing surface 82 of the inner collar 70. The sealing surface 82 includes two axially-extending annular ridges 88 spaced apart from one another by way of an annular groove 90. In the representative embodiment of the invention, a width of the groove 90 is the same as a width of the ridge 88. The widths of the groove 90 and ridge 88 may each be 0.009 inches. Further, the depth of the groove 90 may be 0.006 inches. In addition, while the representative embodiment of the invention illustrates the use of two ridges 88 and one interposed groove 90, it is contemplated that other embodiments of the invention may use any number of ridges 88 and their attendant interposed grooves 90.

Ridges 88 create a multi-point sealing surface 82. That is, each ridge 88 of the sealing surface 82 creates an independent seal with the upstream end 26 of the valve body 22. As such, each ridge 88 is able to independently contact the upstream end 26 of the valve body 22 to seal the downstream portion 86 of the bore 42 from the upstream portion 84 of the bore 42. The multi-point sealing surface 82 provides sealing redundancy that allows a proper seal to occur even if a piece of debris becomes lodged in the inner collar 70 between the diaphragm 50 and the valve body 22. That is, if a piece of debris becomes lodged between one ridge 88 a sealing surface formed by the upstream end 26 of the valve body 22 or within the groove 90 does not prevent the other ridge 88 from contacting the sealing surface of the upstream end 26 of the valve body 22 and sealing off the downstream portion 86 of the bore 42 from the upstream portion 84 of the bore 42.

The diaphragm 50 also includes a stem seat 96 for receiving the upstream end 52 of the stem 46. As shown in FIG. 5, the stem 46 includes a stem head 98 at the upstream end 52 of the stem 46 and disposed within the stem seat 96. The stem 46 also includes a stem body 100 extending from the stem head 98 to the downstream end 48 of the stem 46. The stem head 98 has a larger diameter than the stem body 100 and is disposed within the stem seat 96 of the diaphragm 50. As further discussed above, the stem body 100 tapers from a larger diameter upstream to a smaller diameter downstream. In one embodiment of the invention, the length of the stem 46 may be 1.175 inches. It is also contemplated that the downstream end 48 of the stem 46 may include a rounded edge having a radius of 0.020 inches.

FIGS. 7 and 8 further depict a cross-sectional view of the stem head 98 being disposed within the stem seat 96. The stem head 98 includes a base portion 102 having a first diameter and a stepped portion 104 downstream of the base portion 102 and having a second diameter. The diameter of the base portion 102 is larger than the diameter of the stepped portion 104. Moving downstream, the stepped portion 104 of the stem head 98 is then stepped down to the stem body 100 having a diameter less than the diameter of the stepped portion 104 of the stem head 98. In one embodiment of the invention, the diameter of the base portion 102 may range from 0.199 to 0.201 inches and the diameter of the stepped portion 104 may be 0.120 inches.

In alternative embodiments of the invention, the stem head 98 may be tapered from the diameter of the base portion 102 to the diameter of the stepped portion 104. In yet other embodiments of the invention, the stem head 98 may include a base portion 102 without a stepped portion 104.

As shown in FIG. 8, the diaphragm 50 surrounds the stem head 98 to secure the stem head 98 within the stem seat 96 of the diaphragm 50. The diaphragm 50 includes an annular extension portion 106 extending radially inward from the inner collar 70 at a location 108 adjacent the downstream end 78 of the inner collar 70. The extension portion 106 imitates the offset of the diameter of the base portion 102 of the stem head 98 and the diameter of the stepped portion 104 of the stem head 98. That is, the extension portion 106 of the diaphragm 50 extends radially inward from the inner collar 70 at a distance equal to half the difference between the diameters of the base portion 102 and stepped portion 104. As such, the diaphragm 50 remains in contact with an outer surface 110 of the stem head 98 and secures the stem head 98 within the stem seat 96 of the diaphragm 50.

The stem 46 and diaphragm 50 may be formed in a co-molding process resulting in formation of the stem 46 first and then formation of the diaphragm 50 around the stem head 98. In the first molding step, the stem 46 is molded as described above with respect to the stem head 98 and stem body 100. The previously discussed base portion 102 and stepped portion 104 of the stem head 98 includes the benefit of minimizing flashing attached to the molded stem 46.

As depicted in FIG. 5, the stem head 98 includes indentations 112 circumferentially spaced around the outer surface 110 of the stem head 98. The benefit of these indentations 112 will be further discussed below. While the representative embodiment of the invention depicts the use of eight (8) indentations 112 circumferentially spaced around the outer surface 110 of the stem head 98, it is contemplated that varying embodiments of the invention may include any number of indentations 112.

Figure 4:
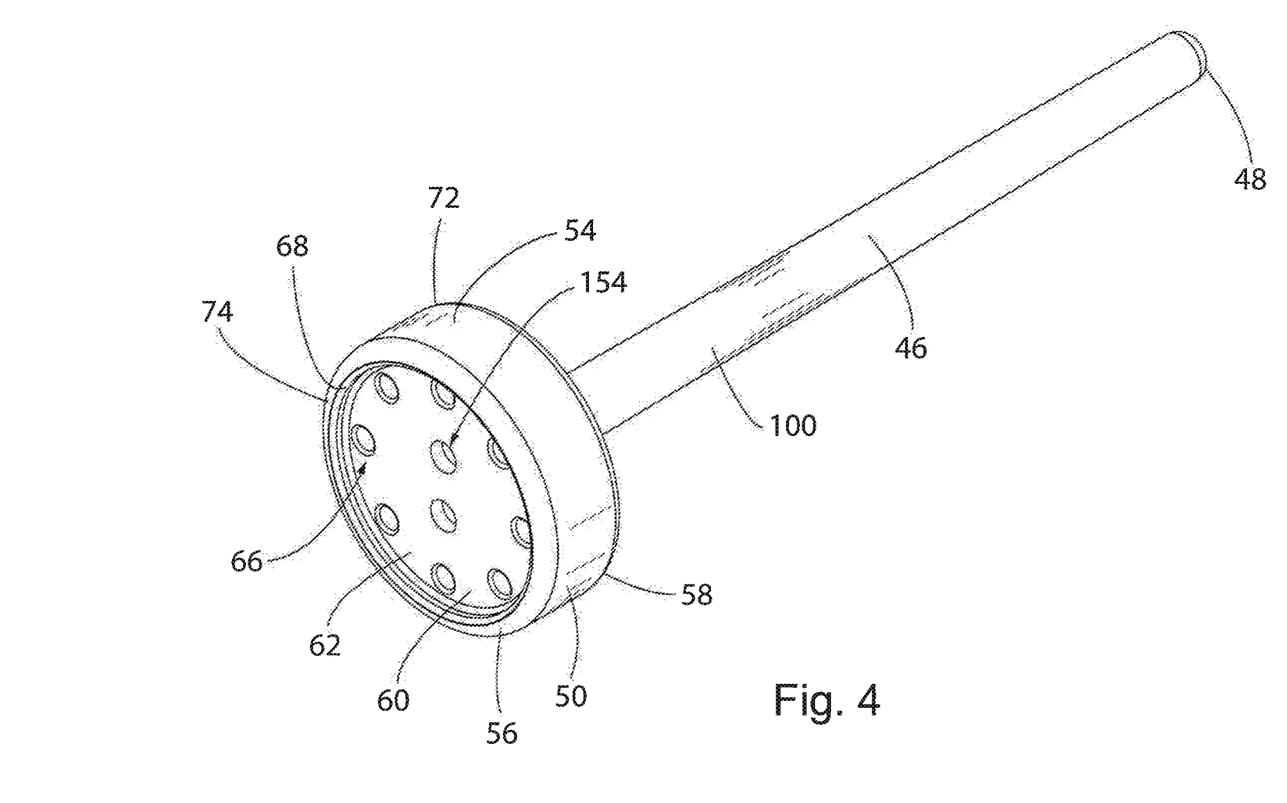
FIG. 4 is a perspective view of a combined stem and diaphragm for use with the animal watering valve of FIG. 1, according to an embodiment of the invention.

In the second molding step, the diaphragm 50 is molded to surround the stem head 98. The resultant diaphragm 50 includes the outer collar 68, inner collar 70, extension portion 106, central portion 60, and apertures 66 previously discussed. During the molding of the diaphragm 50, the material of the diaphragm 50 is able to pass through the indentations 112 of the stem head 98 so that the material may flow to both sides of the stem head 98 and properly surround the stem head 98 to secure it within the stem seat 96. As a result of this co-molding process, the diaphragm 50 is able to surround the stem head 98 while still being formed of a single piece with no seams. As shown in FIG. 4, the central portion 60 of the diaphragm 50 may also include additional apertures 154 centrally disposed therein. These apertures 154 are configured to improved manufacturability of the diaphragm 50 and assist with releasing the diaphragm 50 from the mold after formation.

In use, pivotal movement of the stem 46 in any direction results in movement of the diaphragm 50 away from the sealing surface formed by the upstream end 26 of the valve body 22. In particular, actuation of the stem 46 results in the displacement of the sealing surface 82 of the inner collar 70 from the upstream end 26 of the valve body 22 and allows water to flow from the upstream portion 84 of the bore 42 to the downstream portion 86 of the bore 42 and to the animal. FIGS. 3, 5, and 7 further illustrate the apertures 66 of the diaphragm 50 being disposed at locations between the outer and inner collars 68, 70. As the liquid travels from the upstream end 56 of the diaphragm 50 to the downstream end 58 of the diaphragm 50, the liquid is directed through the apertures 66. As such, when the stem 46 is pivoted in any direction, a portion of the inner collar 70 is displaced from the upstream end 26 of the valve body 22 and the water flows from the upstream portion 84 of the bore 42, through the apertures 66 of the diaphragm 50, and to the downstream portion 86 of the bore 42.

By using a diaphragm 50 that surrounds the stem head 98, the diaphragm 50 completes the seal between the valve cap 24 and the valve body 22. As a result, an O-ring is not required to surround the stem 46 at the stem head 98. By omitting the O-ring found in other animal watering valves, the stem 46 has a wider fulcrum about which to pivot with greater control and consistency of flow and actuating forces. For instance, the valve 10 of the present invention results in actuation from ±2 grams of force, as opposed to ±4-12 grams of force associated with comparable animal watering valves including an O-ring at the stem head. Further, resulting flows of the present invention have a range of ±15 mL, as opposed to ±20-60 mL associated with animal watering valves including an O-ring at the stem head. As such, the improved diaphragm 50 and stem 46 design of the present invention results in more consistent flow and reduced flow variability.

Figure 9:
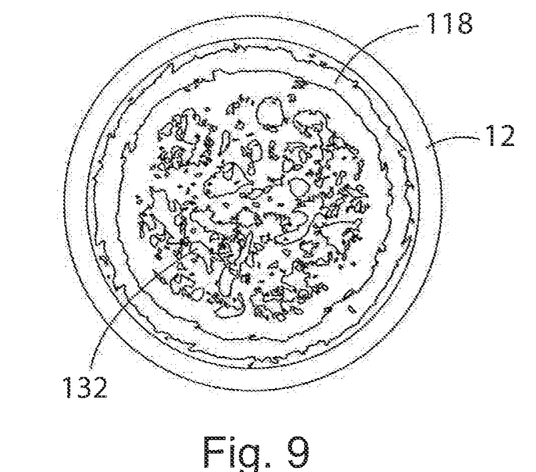
FIG. 9 is an end view of a plug for use with the animal watering valve of FIG. 1.

Referring again to FIG. 3, an upstream end 116 of the valve cap 24 associated with the upstream end 18 of the housing 12 takes the form of a shank configured to mate with a docking mechanism (not shown) of an animal watering system or with another water source such as a tank, bag, etc. A water permeable plug 118 is disposed in the bore 42 upstream of the diaphragm 50 forming the valve element in order to inhibit debris from entering the valve element. In the present embodiment, the plug 118 is sintered metal plug disposed within the upstream end 116 of the valve cap 24 to prevent debris from entering the bore 42 at the inlet 20 when the valve 10 is disconnected from the docking mechanism or other water source. The sintered metal plug 118 may comprise a stainless-steel member that is press-fit or otherwise retained within the bore 42 at the upstream end 116 of the valve cap 24. Alternatively, the plug 118 may comprise polymer materials resistant to temperature changes, thermal expansion of surrounding materials, and chemical reactions associated with chlorine, acid, autoclaving, and the like. Example polymers include R-5100 RADEL® Polyphenylsulfone, R-5800 RADEL® Polyphenylsulfone, and HU1004 ULTEM™ Polyetherimide. FIG. 9 depicts an end view of the plug 118 disposed within downstream end 12 of the housing 12 from the inlet 20 of the watering valve 10.

Still referring to FIG. 3, the bore 42 may include a plug section 122 disposed at the upstream end 18 of the housing 12. A diameter of the plug section 122 may be larger than a diameter of an immediately adjacent section 124. As a result, a radial step 126 is formed at a downstream end 128 of the plug section 122, as the diameter of the plug section 122 changes to the diameter of the adjacent section 124. In one embodiment of the invention, the plug 118 is press-fit so that a downstream end 130 of the plug 118 is at or adjacent the step 126 at the downstream end 128 of the plug section 122. That is, the step 126 acts as a natural stop that prevents the plug 118 from being pressed any further into the bore 42. In other embodiments of the invention, the downstream end 130 of the plug 118 may be spaced apart from the step 126.

The plug 118 may have a length of 2-8 mm, as opposed to a thickness of 0.1 mm associated with commonly used meshes and filters. More particularly, embodiments of the invention may include a plug 118 that is 4 mm long. A plug 118 having a length of less than 2 mm or greater than 8 mm is also contemplated in the present invention.

Figure 10:
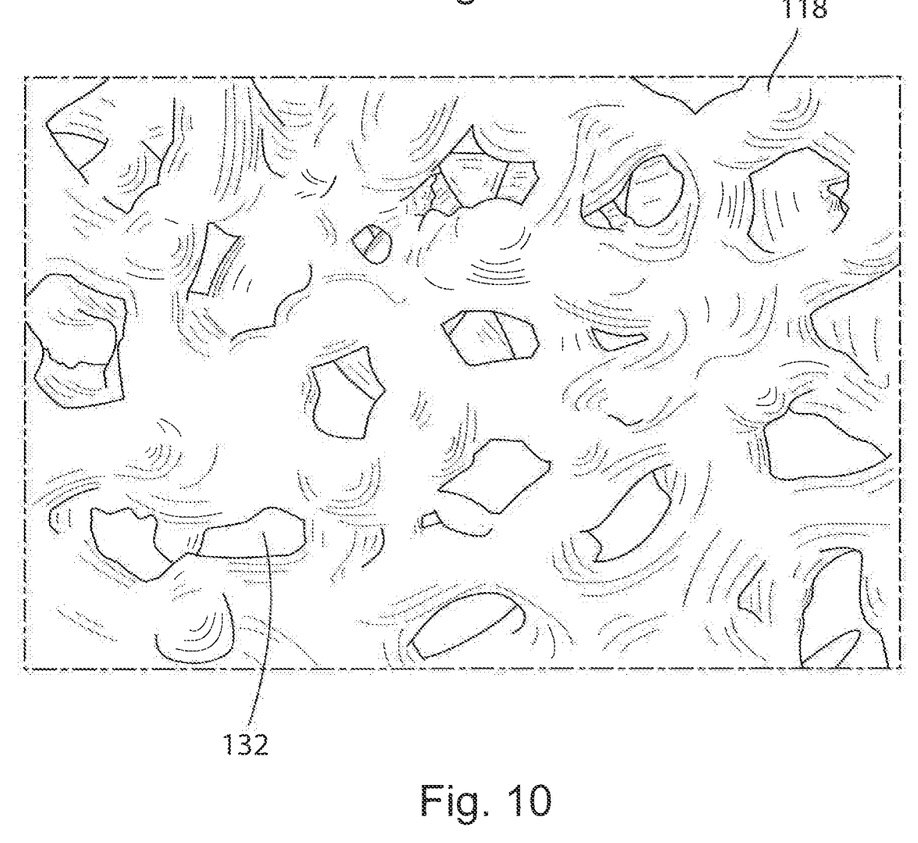
FIG. 10 is an enlarged view of a lattice structure of the plug of FIG. 9.

FIG. 10 is an enlarged view of the plug 118 and depicts a lattice structure 132 of the sintered plug 118. The lattice structure 132 is configured to have pores between 20 and 80 microns in size to trap debris ranging in size from 20 to 80 microns. More particularly, the representative embodiment of the invention includes a plug 118 having a lattice structure 132 with pores sized to about 50 microns to keep out 50-micron sized debris.

By extending the lattice structure 132 of the plug 118 along the length of 2-8 mm, the plug 118 provides multi-path staged filtration that stabilizes the pressure and flow of liquid to a consistent flow at the downstream end 130 of the plug 118. In addition, the length of the plug 118 provides a lattice structure 132 with multiple levels of pores. That is, if debris were to block one of the pores, flow through the plug 118 will be virtually unaffected, as there are hundreds if not thousands of pores in the lattice structure 132 for the water to flow through along the length of the lattice structure 132.

The plug 118 is able to generate steam pressure during autoclaving of the valve 10. Such pressure can remove most or all of trapped debris from the plug 118. For example, by extending the lattice structure 132 along the length of the plug 118, as opposed to a mesh of 0.1 mm thick, pressure is able to build within the plug during autoclaving and eject debris trapped within the lattice structure 132 of the plug 118.

In the representative embodiment of the invention, an upstream end 120 of the plug 118 is aligned flush with the upstream end 116 of the valve cap 24. In varying embodiments of the invention, the upstream end 120 of the plug 118 may be extend beyond, be flush with, or inset from the upstream end 116 of the valve cap 24. As stated above, the plug 118 may comprise stainless steel or polymers, such as, but not limited to R-5100 RADEL® Polyphenylsulfone, R-5800 RADEL® Polyphenylsulfone, and HU1004 ULTEM™ Polyetherimide. In turn, the plug 118 may be formed to include the above described lattice structure 132 by a variety of processes in varying embodiments of the invention. For example, the plug 118 may be formed through a sintering process or through a 3D printing process.

Figure 11:
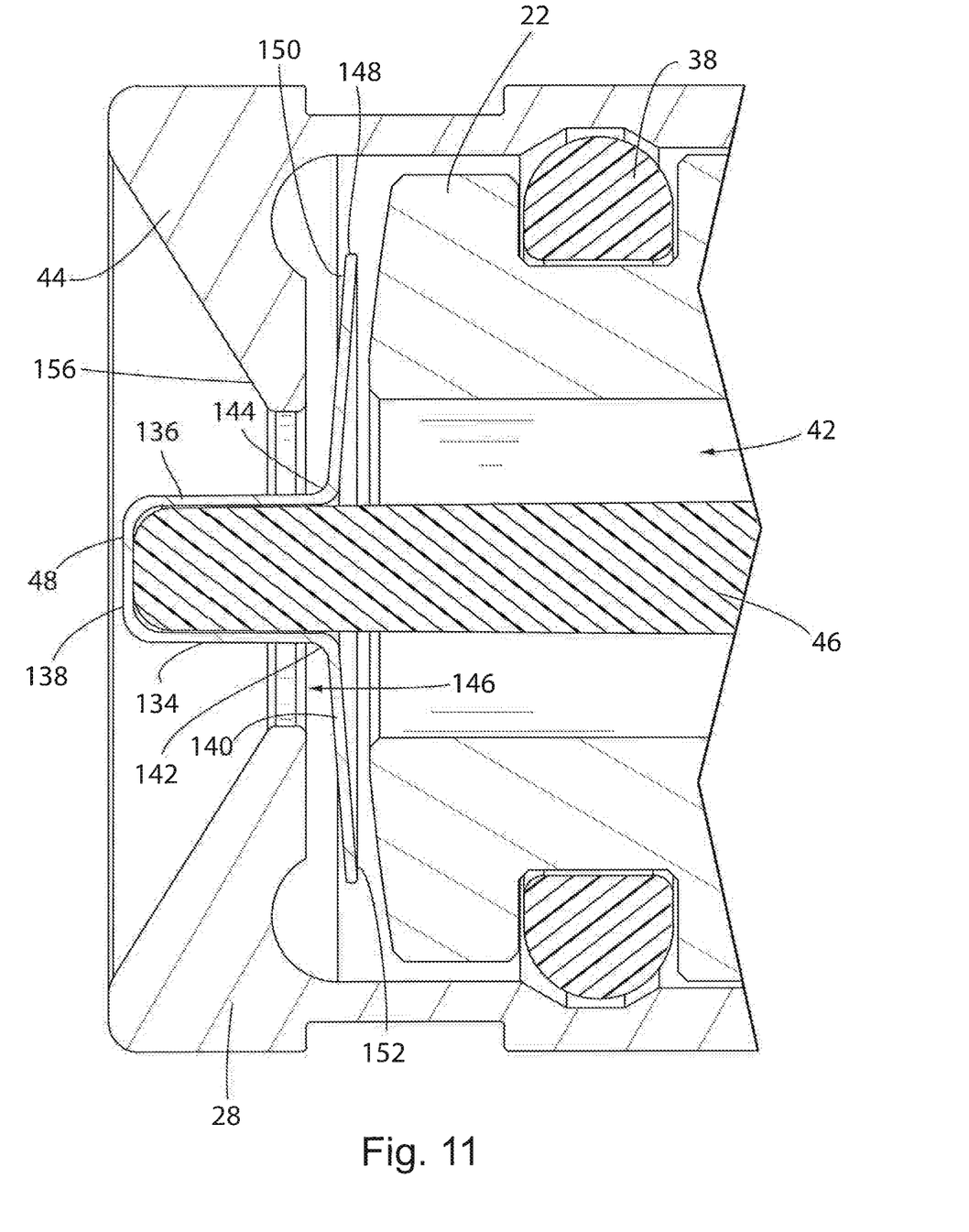
FIG. 11 is enlarged fragmentary cross-sectional view of a downstream portion of the animal watering.

Referring now to FIG. 11, an enlarged section of the downstream end 14 of the watering valve 10 is illustrated to better depict the outlet 16, the stem 46, and a shield. The shield of this embodiment comprises a stem hat 134 mounted on the downstream end 48 of the stem 46. The stem hat 134 may be formed from stainless steel or a similar material. For example, the stem hat 134 may comprise 316L stainless steel. The stem hat 134 includes a cap 136 disposed at a downstream end 138 of the stem hat 134 and a disk 140 disposed at an upstream end of the stem hat 134. The cap 136 is a hollow cylindrical element having a closed outer end and an open inner end. The stem cap 136 is configured to overly and to be coupled to the downstream end 48 of the stem 46. For example, the downstream end 48 of the stem 46 may be inserted into the stem cap 136 from the open inner end of the stem cap 136 and press-fit into the cap 136 of the stem hat 134.

The stem hat 134 also includes a disk 140 disposed at an upstream end 142 of the stem hat 134. The stem hat 134 is configured to extend radially from the stem 46 at a location 144 adjacent an upstream side 146 of the outlet 16 of the housing 12. For example, a downstream surface 150 of the disk 140 may be axially-spaced between 0.001 and 0.005 inches upstream from the outlet 16. As a result of the axially spacing described above, the stem 46 of this embodiment is able to deflect or pivot upwards of 2° and to up to 2.7° or more in any direction without coming in contact with an upstream edge 156 of the wiping surface or the downstream end 30 of the valve body 22.

The disk 140 has a diameter greater than that of the outlet 16. Further, the disk 140 is sized so that an outer edge 148 of the disk 140 remains transversely outside of the outlet 16 during deflection of the stem 46. That is, when the stem 46 is fully deflected, the disk 140 is still positioned to cover the outlet 16. As a result, the stem hat 134 protects the valve 10 from debris entering the outlet 16.

As the disk 140 is disposed upstream from the outlet 16, the liquid may navigate the disk 140 before exiting the outlet 16. For example, the liquid dispensed by the valve 10 is required to travel along an upstream surface 152 of the disk 140, along the outer edge 148 of the disk 140, and along the downstream surface 150 of the disk 140 to travel to the outlet 16. The fluid then exits the outlet 16. Here, the fluid is free to travel along the stem hat 134 or along the flared wiping surface 44 at the downstream end 14 of the housing 12. Beneficially, the fluid is then able to dislodge any debris located along the flared wiping surface 44 of the valve guard 28 with a flushing effect. The wiping surface 44 also wipes the outer surface of the disk 140 free of debris during valve actuation and resultant radial disk movement.

Additionally, the disk 140 of the stem hat 134 acts to prevent axially movement of the stem 46 and the diaphragm 50 due to an animal pushing on the downstream end 48 of the stem 46. If an animal were to push on the downstream end 48 of the stem 46, the upstream surface 152 of the disk 140 would come in contact with the downstream end 30 of the valve body 22 before the stem 46 and diaphragm 50 could substantially move upstream along the longitudinal axis. As such, the stem hat 134 also prevents any threat of an animal or handling damage affecting the diaphragm seal with the valve body 22 by pushing on the downstream end 48 of the stem 46.

Other embodiments and uses of the invention will be apparent to those skilled in the art from consideration from the specification and practice of the invention disclosed herein. It is understood that the invention is not confined to the specific materials, methods, formulations, operating/assay conditions, etc., herein illustrated and described, but embraces such modified forms thereof as come within the scope of the following claims.

What is claimed is:

1. An animal watering valve comprising:
   a housing having an upstream end, a downstream end, and a longitudinal bore formed therein and extending from the upstream end to the downstream end;
   a valve element and a valve actuator located at least in part in the bore; and
   a plug disposed in the bore at the upstream end of the housing, the plug having a lattice structure extending lengthwise of the plug.

2. The animal watering valve of claim 1, wherein an upstream end of the plug is flush with the upstream end of the housing.

3. The animal watering valve of claim 1, wherein the lattice structure includes pores having a size of 20 to 100 microns.

4. The animal watering valve of claim 3, wherein the lattice structure includes pores having a size of 50 microns.

5. The animal watering valve of claim 1, wherein the length of the plug is 2-8 mm.

6. The animal watering valve of claim 5, wherein plug comprises a sintered metal plug.

7. The animal watering valve of claim 1, wherein the plug is press-fit into the upstream end of the housing.

8. The animal watering valve of claim 1, wherein the bore includes a plug section disposed at the upstream end of the housing;
   wherein a diameter of the plug section is larger than a diameter of an adjacent section of the bore to form a step at a downstream end of the bore; and
   wherein the plug is press-fit into the plug section of the bore so that a downstream end of the plug is at or adjacent the step of the bore.

9. An animal watering valve comprising:
   a housing having an upstream end, a downstream end, and a bore formed therein and extending from the upstream end to the downstream end;
   a diaphragm disposed within the bore and separating the bore into a downstream portion and an upstream portion, the diaphragm comprising:
      a stem seat; and
      a sealing surface; and
   a stem having a stem head and a stem body extending downstream from the stem head, the stem head disposed within the stem seat and surrounded by the diaphragm;
   wherein the valve is structurally and operationally configured such that actuation of the stem opens the sealing surface and allows a liquid to flow from the upstream portion of the bore to the downstream portion of the bore,
   wherein the sealing surface includes at least first and second annular ridges and at least one annular groove located between the first and second ridges, and
   wherein each ridge is able to independently seal off the upstream portion of the bore from the downstream portion of the bore.

10. The animal watering valve of claim 9, wherein a width of the at least first and second annular ridges is equal to a width of the at least one annular groove.

11. A method of forming an animal watering valve comprising:
    molding the stem to include a stem head and a stem body extending from the stem head; and
    molding a diaphragm to include an outer collar, an inner collar, and a stem seat that surrounds an outer circumferential periphery and an inner axial end of the stem head.

12. The method of claim 11, wherein molding the diaphragm comprises molding the inner collar to have a sealing surface with at least first and second annular ridges and at least one annular groove located between the first and second ridges.

13. The method of claim 11, wherein molding the diaphragm comprises forming a plurality of apertures that are circumferentially spaced around the diaphragm.

14. An animal watering valve comprising:
    a housing having an outlet, an inlet, and a bore formed therein and extending from the outlet to the inlet;
    a valve element located in the bore;
    a stem disposed within the housing in a cooperating relationship with the valve element and extending through the outlet of the housing;
    a stem hat coupled to a downstream end of the stem, the stem hat having a cap and a disk extending radially from the stem at a location adjacent an upstream side of the outlet.

15. The animal watering valve of claim 14, wherein a diameter of the disk is greater than a diameter of the outlet.

16. The animal watering valve of claim 14, wherein the diameter of the disk is sized so that an outer edge of the disk remains transversely outside the outlet upon maximum deflection of the stem.

17. The animal watering valve of claim 16, wherein the stem can be radially deflected up to 2.7°.

18. The animal watering valve of claim 14, wherein the disk is axially spaced 0.001 to 0.005 inches from the outlet.

19. The animal watering valve of claim 14, wherein the stem comprises a polymer material, and the stem hat comprises a stainless-steel material.

* * * * *